US009438448B2

(12) United States Patent
Tripathi et al.

(10) Patent No.: US 9,438,448 B2
(45) Date of Patent: Sep. 6, 2016

(54) MAINTAINING COMMUNICATION CONNECTIONS DURING TEMPORARY NETWORK DISRUPTIONS

(75) Inventors: Ashutosh Tripathi, Hyderabad (IN); Balasubramanian Rajagopalan, Hyderabad (IN); Madhur Dixit, Hyderabad (IN); Rahul Singh, Hyderabad (IN); Srinivasa Reddy Manda, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 887 days.

(21) Appl. No.: 12/542,894

(22) Filed: Aug. 18, 2009

(65) Prior Publication Data

US 2011/0047219 A1    Feb. 24, 2011

(51) Int. Cl.
| | | |
|---|---|---|
| G06F 15/16 | (2006.01) |
| H04L 12/58 | (2006.01) |
| H04L 12/24 | (2006.01) |
| H04L 12/26 | (2006.01) |
| H04L 29/08 | (2006.01) |
| H04L 29/14 | (2006.01) |

(52) U.S. Cl.
CPC ......... *H04L 12/581* (2013.01); *H04L 12/5835* (2013.01); *H04L 41/0654* (2013.01); *H04L 41/0816* (2013.01); *H04L 41/0883* (2013.01); *H04L 43/0811* (2013.01); *H04L 51/04* (2013.01); *H04L 51/066* (2013.01); *H04L 67/14* (2013.01); *H04L 67/145* (2013.01); *H04L 69/40* (2013.01)

(58) Field of Classification Search
CPC ..... H04L 67/14; H04L 12/581; H04L 51/04; H04L 67/145; H04L 41/0654; H04L 69/40
USPC ................................ 709/206, 207, 227, 228
See application file for complete search history.

(56) References Cited

U.S. PATENT DOCUMENTS

| | | | | |
|---|---|---|---|---|
| 5,473,669 | A | | 12/1995 | Kanada et al. ............ 455/435.2 |
| 6,567,848 | B1 | * | 5/2003 | Kusuda et al. ............... 709/219 |
| 7,058,036 | B1 | * | 6/2006 | Yu et al. ....................... 370/335 |
| 7,650,432 | B2 | * | 1/2010 | Bosworth et al. ........... 709/248 |
| 7,747,244 | B2 | * | 6/2010 | Alfano et al. ............. 455/414.1 |
| 8,340,699 | B2 | * | 12/2012 | Testone et al. ............... 455/466 |
| 2002/0173308 | A1 | * | 11/2002 | Dorenbosch et al. ........ 455/435 |
| 2003/0236907 | A1 | * | 12/2003 | Stewart et al. ............... 709/231 |
| 2004/0158609 | A1 | * | 8/2004 | Daniell et al. ............... 709/206 |
| 2005/0198379 | A1 | | 9/2005 | Panasyuk et al. ............ 709/239 |
| 2006/0037072 | A1 | * | 2/2006 | Rao et al. ....................... 726/14 |

(Continued)

OTHER PUBLICATIONS

Beal, V.; "*IM Watch: Busy Week for Mobile IM*"; Instant Messaging Planet.com; Jun. 5, 2007; 5 Pgs.

(Continued)

*Primary Examiner* — David Lazaro
(74) *Attorney, Agent, or Firm* — Tim Wong; Micky Minhas

(57) ABSTRACT

Network disconnections are automatically detected between a client application and a server When a disconnection is detected by either the client or server, a determination is made as to whether the disconnection is a temporary disconnection or a longer-lasting disconnection. While disconnected, attempts are made to automatically reconnect the client and server. During the disconnected period, a subset of communication functions remain operable. When the connection is restored, presence/availability information is automatically delivered to the client.

12 Claims, 4 Drawing Sheets

(56) References Cited

U.S. PATENT DOCUMENTS

| | | | |
|---|---|---|---|
| 2006/0075039 A1* | 4/2006 | Narayanaswami et al. | 709/206 |
| 2006/0200559 A1 | 9/2006 | Ling et al. | 709/224 |
| 2006/0291481 A1* | 12/2006 | Kumar | 370/400 |
| 2007/0005773 A1* | 1/2007 | Apreutesei et al. | 709/227 |
| 2007/0054627 A1* | 3/2007 | Wormald | 455/70 |
| 2007/0112954 A1* | 5/2007 | Ramani et al. | 709/224 |
| 2007/0203987 A1 | 8/2007 | Amis | 709/206 |
| 2008/0059605 A1 | 3/2008 | Shalev et al. | 709/217 |
| 2008/0081627 A1* | 4/2008 | Shan et al. | 455/445 |
| 2008/0146258 A1* | 6/2008 | Testone et al. | 455/466 |
| 2009/0088144 A1* | 4/2009 | Beadle et al. | 455/419 |
| 2009/0164611 A1* | 6/2009 | Corda et al. | 709/222 |
| 2011/0078773 A1* | 3/2011 | Bhasin et al. | 726/5 |

OTHER PUBLICATIONS

Rudisch, et al.; "*Transparent extention of existing applications for mobile computing*"; Telecooperation Group, University of Linz/ Telecooperation Office, University of Karlsruhe; 11 Pgs.

Good Technology; "*Moving Good Messaging Server to a New Host*"; http://www.good.com/documentation5/Domino_Admin_Guide/Good%20Messaging%205.0%20Admin%20for%20Domino-08-2.html; 2 Pgs.

Kureshy, A.; "*Architecting Disconnected Mobile Applications Using a Service Oriented Architecture*"; MSDN; Sep. 2004; 12 Pgs.

\* cited by examiner

MAINTAINING COMMUNICATION CONNECTIONS DURING TEMPORARY NETWORK DISRUPTIONS

BACKGROUND

Different applications are designed to make communication easier and more accessible by providing users with a variety of information and functionality. For example, a user may have the ability to: view real-time presence information of users; reach a user using a single contact method; support instant messaging (IM) capability; and the like. These applications rely on each of the devices communicating to be connected to a network in order to receive data over the network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Network disconnections are automatically detected between a client communication application and a server. When a disconnection is detected by either the client or the server, a determination is made as to whether the disconnection is a temporary disconnection or a longer-lasting disconnection. When the disconnection is temporary, the server maintains the connection with the client as if it were connected such that the client will not have to re-login to the communication system after the disconnection is restored. While disconnected, attempts are made to automatically reconnect the client and server. During the disconnected period, a subset of communication functions remain operable. For example, a user may be able to look up contact information, make a phone call, receive/deliver a Short Messaging Service (SMS) message, and the like. Additionally, during the disconnection, Instant Messaging (IM) actions may be converted to Short Messaging Service (SMS) requests. When the connection is restored, presence/availability information is automatically delivered to the client.

DETAILED DESCRIPTION

Figure 1:
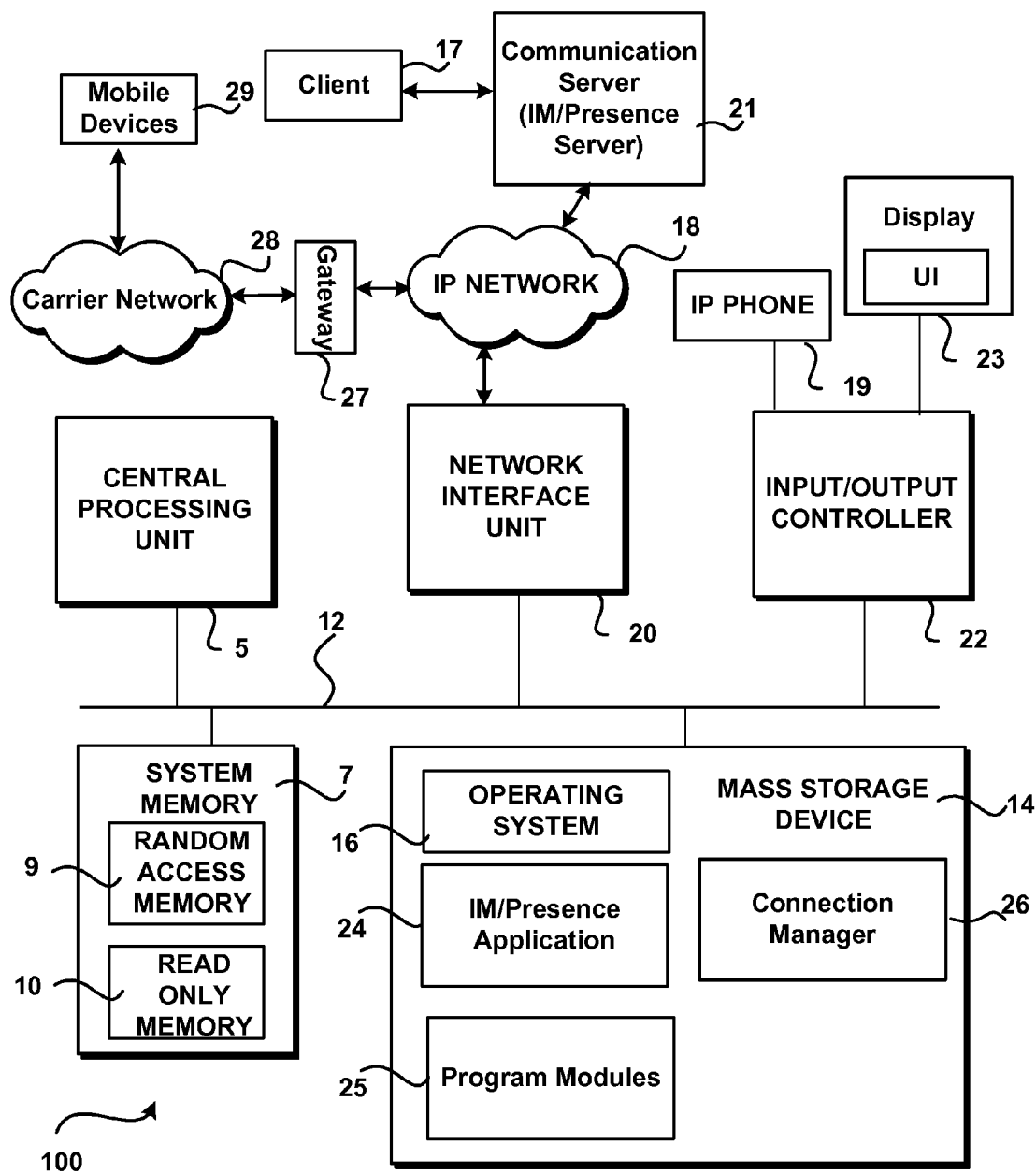
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 may be configured as a mobile device, a server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, presence application 24, other program modules 25, and connection manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. While computer 100 is shown connected to IP network 18, computer 100 may also be configured to connect directly to carrier network 28. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone 19, a display screen 23, a printer, or other type of output device.

Carrier network 28 is a network responsible for communicating with mobile devices 29. The carrier network 28 may include both wireless and wired components. For example, carrier network 28 may include a cellular tower that is linked to a wired telephone network. Typically, the cellular tower carries communication to and from mobile devices, such as cell phones, notebooks, pocket PCs, long-distance communication links, and the like.

Gateway 27 routes messages between carrier network 28 and IP Network 18. For example, communications manager 26 may route a call or some other message to a mobile device on carrier network 28 and/or route a call or some other message to a user's device on IP network 18. Gateway 27 provides a means for transporting the communication from the IP network to the carrier network. Conversely, a user with a device connected to a carrier network may be directing a call to a client on IP network 18.

As mentioned briefly above, a number of program modules and data files may be stored in the mass storage device 14 and RAM 9 of the computer 100, including an operating system 16 suitable for controlling the operation of a computer, such as WINDOWS 7®, WINDOWS COMMUNICATION SERVER® or the WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, such as IM/Presence application 24 and program modules 25.

User Interface (UI) may be utilized to view and perform operations relating to presence application 24, as well as other activities relating to performing operations using computing device 100.

According to one embodiment, connection manager 26 communicates with a presence application 24 such as MICROSOFT's OFFICE COMMUNICATOR®. While connection manager 26 is illustrated as an independent program, the functionality may be integrated into other software and/or hardware. For example, connection manager 26 may be integrated into presence application 24. Connection manager 26 is configured to perform operations relating to communications between computer 100 and an Instant Messaging (IM)/Presence server such as communication server 21. Generally, connection manager 26 is configured to automatically detect network disconnections with one or more communication servers, such as communication server 21. Communication server 21 may also be configured to independently detect network disconnections with presence application 24 on computing device 100. When a disconnection is detected, a determination is made as to whether the disconnection is a temporary disconnection or a longer-lasting disconnection. When the disconnection is temporary, communication server 21 maintains the connection with computing device 100 as if it were connected such that computing device 100 does not have to re-login to the communication server after the temporary disconnection is restored. While disconnected, connection manager 26 attempts to automatically reconnect the computing device 100 with communication server 21. During the disconnected period, a subset of communication functions remain operable. For example, a user may be able to look up contact information, make a phone call, receive/deliver a Short Messaging Service (SMS) message, and the like. Additionally, during the disconnection, Instant Messaging (IM) actions created by presence application 24 may be automatically converted to Short Messaging Service (SMS) requests and then sent to the device intended to receive the IM. When the connection is restored, presence/availability information is automatically delivered to communication device 100. The operation of communications manager 26 is described in more detail below.

Figure 2:
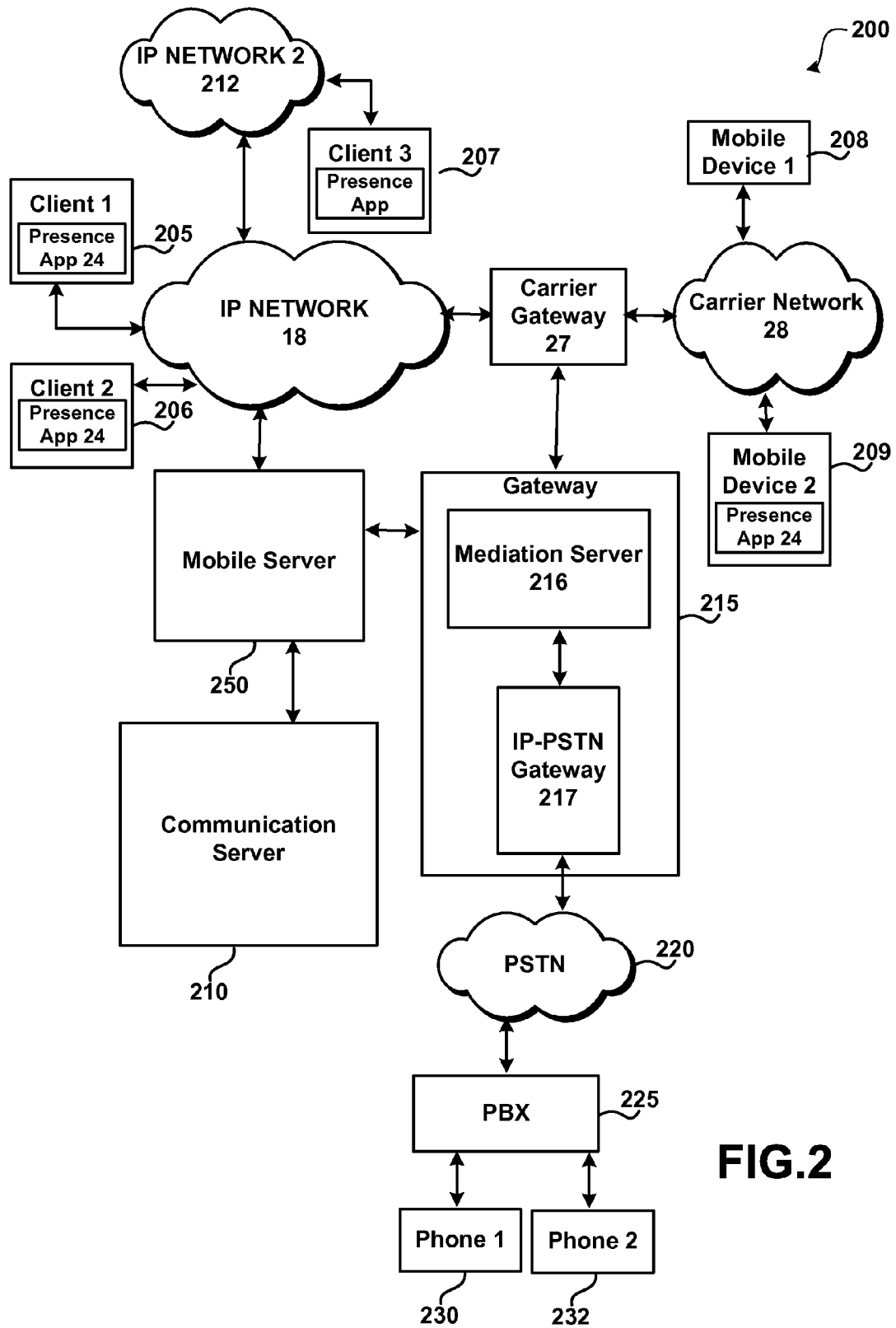
FIG. 2 shows a system for transitioning between connected and disconnected states.

FIG. 2 shows a communications system for transitioning between connected and disconnected states. As illustrated, system 200 includes client 1 (205) and client 2 (206) that is coupled to IP Network 18, client 3 (207) that is coupled to IP Network 2 (212), mobile device 1 (208) and mobile device 2 (209) that are coupled to carrier network 28, communication server 210, mobile server 250, carrier gateway 27, gateway 215, mediation server 216, IP-PSTN gateway 217 coupled to PBX 225 through PSTN 220 and phone 1 (230) and phone 2 (232).

The communication server 210 is configured as an Instant Messaging/Presence server and is configured to route communications to the appropriate destinations. According to one embodiment, communications server 210 runs Microsoft's OFFICE COMMUNICATION SERVER® operating system. Some of the client devices (205, 206, 207 and 209) are configured with a presence application, such as Microsoft's OFFICE COMMUNICATOR® application. Other presence applications may also be utilized. According to one embodiment, communications server 210 utilizes SIP for communication sessions. For more information on this industry standard protocol see IETF RFC 3261 which may be found at http://www.ietf.org/rfc/rfc3261.txt. Generally, SIP defines a standard for session setup, termination, and media negotiation between two parties that is widely used for Voice-over-IP (VoIP) call signaling.

Generally, communication server 210 routes communications (e.g. IMs)/calls to endpoints on the IP network (IP-IP calls); routes calls to the public switched telephone network (PSTN)/PBX (IP-PSTN calls) and may also route communications/calls to destinations using other networks, such as a carrier network (i.e. carrier network 28). The communication server 210 may be coupled to the networks through one or more gateways. A gateway translates signaling and media between the network and the IP voice infrastructure. The gateway 215 may be composed of one or more devices. For example, the gateway 215 may be implemented as a mediation server 216 and an IP-PSTN gateway 217 or the functionality of the mediation server and the IP-PSTN may be included within the gateway as illustrated. Generally, IP-PSTN gateway 217 is a gateway that is located between a landline phone (i.e. phone 1 (230) or phone 2 (232)) and any SIP User Agent Client (i.e. client 1 (205), client 2 (206), client 3 (207)). Gateway 217 allows a person to call any (allowed) telephone number from any SIP-compliant client application.

Mediation Server 216 provides signaling and media translation between the VoIP infrastructure and a gateway. Mediation Server 216 also links the Communication Server 210 with a PBX 225. On the communications server side, the mediation server 216 listens on a mutual TLS transport address. TLS (Transport Layer Security), is a protocol for establishing a secure connection between a client and a server. TLS (Transport Layer Security) is capable of authenticating both the client and the server and creating a encrypted connection between the two. The TLS (Transport Layer Security) protocol is extensible, meaning that new algorithms can be added for any of these purposes, as long as both the server and the client are aware of the new algorithms. On the gateway side, mediation server listens on a single TCP/IP transport address. Generally, the mediation server 216 is configured for: translating SIP over TCP (on the gateway side) to SIP over mutual TLS (on the Enterprise Voice side); encrypting and decrypting SRTP (Secure Real-time Transport Protocol) on the communications server side; translating media streams between the communications server and the gateway; connecting clients that are outside the network to internal ICE (Interactive Connectivity Establishment) components, which enable media traversal of NAT and firewalls; and acting as an intermediary for call flows that a gateway does not support, such as calls from remote workers on an enterprise voice client.

Communications server 210 may be configured to provide communication services for one or more locations. For example, communications server 210 may be utilized for a business having branch offices that are connected using IP Network 18 and/or other IP networks (e.g. IP Network 2 (212)). For example, client 3 may be located at a branch office while communication server 210 is located at the main office.

Communication Server 210 is also configured to establish one or more communication channels between devices that desire to communicate. For example, communication server 210 may configure one or more communication channels between client 1 and client 3, client 1 and client 2, client 2 and mobile device 2, and the like. The communication channels may be used for different types of communications, such as VoIP, IM messages, data messages, and the like. Generally, any type of communication that is supported by IM/Presence communication server 210 may be established.

Mobile server 250 is configured to act as a front end to the presence application running in the client devices and hides the details of the access operations from the core enterprise messaging server (e.g., communication server 210). Although illustrated separately from communication server 210, the functionality of mobile server 250 may also be included within communication server 210. According to one embodiment, the presence application(s) utilize the HTTP protocol to connect to mobile server 250. The mobile server 250 utilizes appropriate methods to communicate with communication server 210 (e.g., the Session Initiation Protocol).

Presence application 24 running on a client device (e.g. mobile device 209) is configured to maintain a heartbeat connection to mobile server 250 through a communication channel that is opened between the mobile device and the mobile server. According to one embodiment, the communication is through an HTTP communication connection. Presence application 24 opens the communication connection and posts an HTTP request for a heartbeat response or an incoming notifications response sent utilizing communication server 210 and mobile server 250. Mobile server 250 generally responds to the request within a certain set time period depending on the particular communication. When a notification is ready to be sent to the mobile device, then mobile server 250 sends the notification immediately. When there are no notifications to send to the mobile device, mobile server 250 waits a predetermined period of time before sending the response. After receiving the response, the presence application 24 then opens a connection and posts a new HTTP request, and the cycle continues. When presence application 24 is not able to open the connection and connect to mobile server 250, presence application 24 detects a state of disconnection. Presence application 24 may also detect a disconnection when it tries to set up other HTTP connections for sending IM, search or call-related requests, and the like. Disconnections are detected either actively when performing actions relating to presence application 24 and/or when the client device is in a passive state and is not performing any activity relating to presence application 24.

In addition to the presence application on the client device detecting disconnections, mobile server 250 is configured to automatically detect disconnections. According to one embodiment, mobile server 250 delays in responding to a heartbeat request until some predetermined period of time has elapsed. This period of time may be configured by an authorized user. Delaying the heartbeat response is directed at saving bandwidth. For example, when an IM message is sent to the client device a heartbeat response is not needed and therefore a message is saved from being sent over the communication channel. At the end of the predetermined period, mobile server 250 sends a heartbeat response to the presence application 24 on the client device. According to one embodiment, the heartbeat response is an empty response (i.e. the response has no content). When there is an incoming IM request or voice call request, mobile server 250 sends a notification immediately to the presence application 24 on the client device. In either case, if there is a disconnection, mobile server 250 detects it by not being able to send a message over the communication channel that is established between the server and the client.

When a disconnection is detected by either the client device and/or the server, a determination is made as to whether the disconnection is a temporary disconnection. A temporary disconnection state may be represented to other client devices to indicate that the user of the client device is "away" from their device. The indication of the "Away" status is set after a period of time has elapsed. For example, the "Away" status may be set for a relatively short period of time (e.g. 5 minutes, 10 minutes, 15 minutes, 20 minutes). This "Away" status during the disconnected period corresponds to the situation, where a user that was active has been inactive for a period of time. Other users seeing this "Away" status understand that they may not get a response to an IM request for some period of time. During this period of temporary disconnection, mobile server 250 caches incoming presence updates (corresponding to the contacts that the mobile user has subscribed to), with the expectation that the network disconnection is temporary and will be automatically re-established. According to one embodiment, incoming IM or call notifications are responded to with an error message indicating that the user cannot be reached.

When the temporary disconnection lasts for a longer time period (e.g. 30 minutes) without the communication channel being reestablished, mobile server 250 is configured to sign out the user from communication server 210. This results in the user being shown as "Offline" to other users looking at the online status information for the user. Other time periods may also be set as to when to consider the user offline.

During the time of the disconnection, presence application 24 and/or mobile server 250 periodically attempts to reestablish the communication channel between the server and the client device. Once the data connection becomes available, the communication channel can become re-established. The connection becomes re-established without requiring the user to perform any actions. The user also does not have to re-login to the communication server 210 after being temporarily disconnected.

Once the network connectivity is restored and the communication channel is opened between messaging server 250 and the client device presence/availability information is automatically delivered to the client device. When connectivity is restored between the time the user was set to "Away" and before the user is considered offline and is automatically signed out by mobile server 250, reconnections do not involve the expensive process of signing in to communication server 210. In this case, the cached presence updates are delivered to the client device without requiring the user to perform any special operations due to the temporary disconnection. A temporary disconnection may occur when a device (e.g. mobile device 209) receives a telephone call causing the data channel connection for the mobile device to be disconnected. When the call is over, the presence application resumes quickly if the call duration is only considered a temporary disconnection as determined by the time period configured for automatically signing the user out. According to one embodiment, the time periods for determining when a user is "Away" and when the user is considered "Offline" is configured in mobile server 250. Mobile server 250 is also configured to deliver any IMs that were not deliverable to the client device since the client was in a temporarily disconnected state.

In some instances, data connectivity is lost for long periods of time (e.g., certain roaming scenarios). In these cases, the presence application provides a visual indication of disconnected state. According to one embodiment, the presence application is configured to cache the last received contact list such that the user may perform a subset of functions relating to the presence application when the device is disconnected. For example, a user may search for numbers, addresses, in the cached contact list as well as make telephone calls. The presence application is also configured to automatically convert IMs into Short Messaging Service (SMS) requests when in a disconnected state such that a message may still be sent to other devices even though the device is temporarily disconnected.

Figure 3:
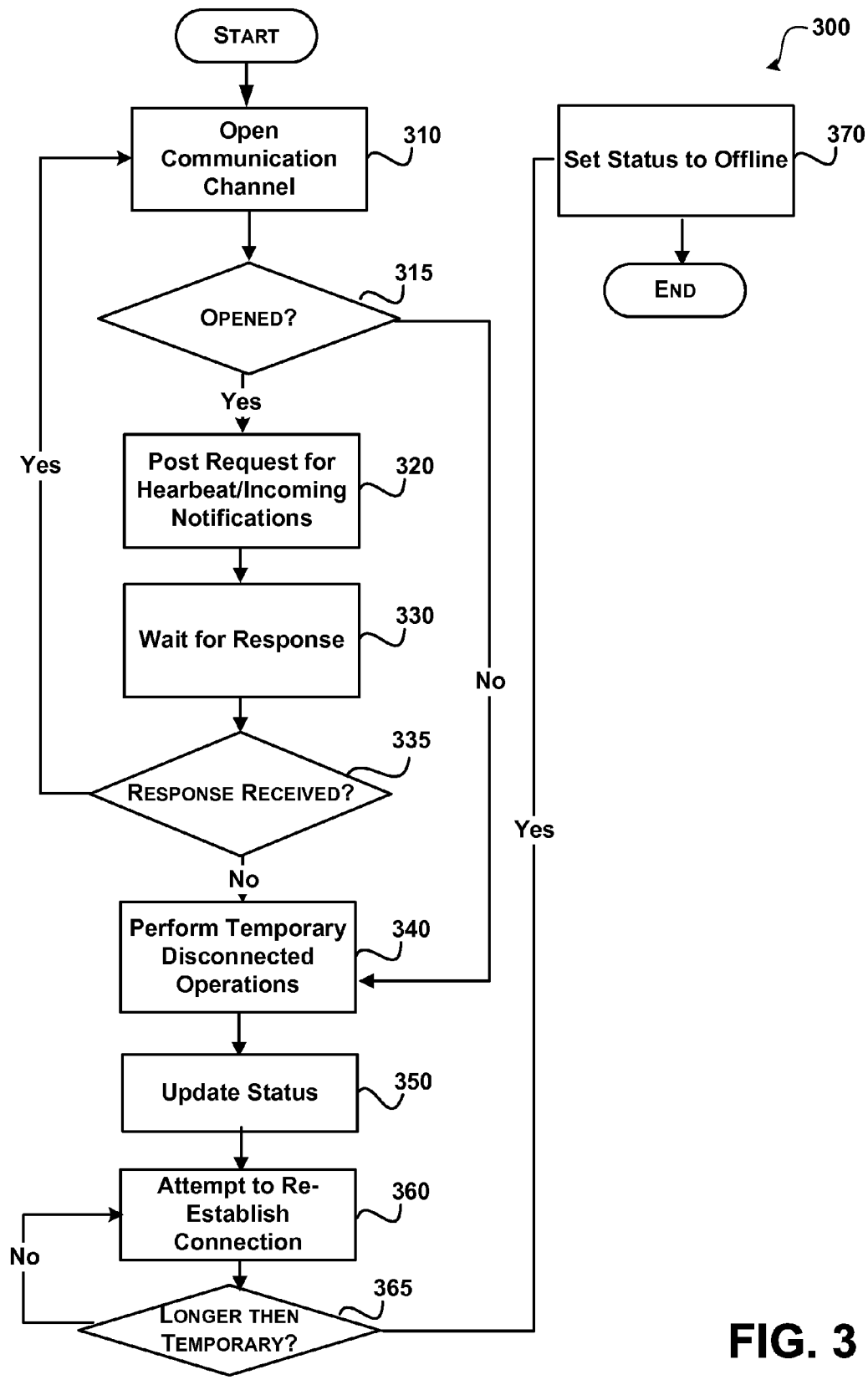
FIG. 3 illustrates a process for a client maintaining a communication connection during a temporary disconnected state.
Figure 4:
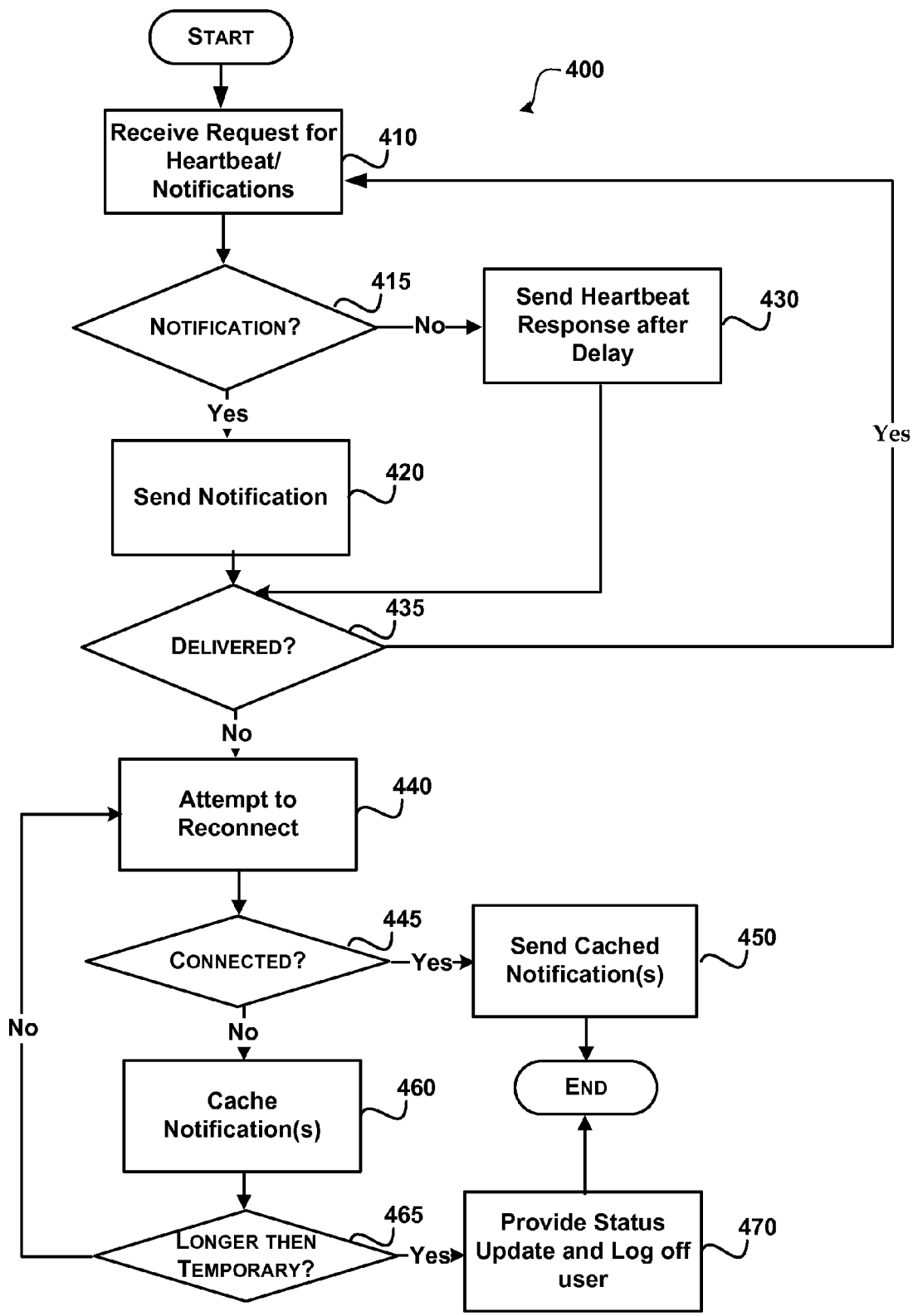
FIG. 4 shows a process for a server maintaining a communication connection during a temporary disconnected state.

Referring now to FIGS. 3-4, illustrative processes for handling network disruptions are described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 illustrates an overview process for maintaining a communication connection during a temporary disconnected state.

After a start operation, the process flows to operation 310, where a communication channel is attempted to be opened between the client device and a server. According to one embodiment, the HTTP protocol is used in attempting to open a communication channel with the server.

Flowing to decision operation 315, a determination is made as to whether the communication channel was able to be opened. When the communication is not able to be opened, the process moves to operation 340.

When the communication channel is opened, the process moves to operation 320, where the client device requests to receive a heartbeat or any IM notifications from the server. A heartbeat request is a request for a response that indicates that a connection still exists between the client and the server. According to one embodiment, this response is an empty response that does not contain any information. An IM notification response may be a status update and/or any other IM communication that is sent by the communication server.

Flowing to operation 330, the client waits for a response. The time period to wait is configurable and may be automatically determined based on the connection that is established between the client and the server. According to one embodiment, this waiting period may automatically be changed during the connection. For example, initially the time period may be set to one minute and then, as the connection is determined to be more stable, may be automatically extended in time increments until the maximum time is reached. For example, each request that is sent by the client device may wait a longer time for the response.

Transitioning to decision operation 335, a determination is made as to whether a response is received within the configured time period. When a response is received, the process returns to operation 310 to re-start the process such that the process is periodically performed.

When a response is not received, the process flows to operation 340, where the client device operates in a temporary disconnected mode. As discussed above, the presence application on the device may be configured to perform a subset of the operations that are associated with the presence application. For example, during the disconnected state, the presence application may automatically convert IM messages created by the client to SMS messages when a receiving device is capable of receiving SMS messages.

Moving to operation 350, the status of the device is displayed to the user thereby indicating that the user does not have an active connection.

Flowing to operation 360, the device attempts to automatically re-establish connection with the server. According to one embodiment, the process periodically attempts to re-establish the communication channel between the client and the server.

Transitioning to decision operation 365, a determination is made as to whether the disconnection is longer then temporary. For example, when the disconnection lasts for a time period that exceeds a predetermined time period then the disconnection is considered to be longer then temporary and the user is "Offline." According to one embodiment, this time period is greater then thirty minutes. Other time periods may also be used.

When the disconnection is not longer then a temporary disconnection, the process returns to operation 360. When the disconnection is longer then a temporary disconnection, the process moves to operation 370, where the status is set to offline indicating to the user that they must login to the server in order to perform operations relating to the presence application.

The process then flows to an end operation and returns to processing other actions.

FIG. 4 shows a process for a server maintaining a communication connection during a temporary disconnected state.

After a start operation, the process flows to operation 410, where the server receives a request for a heartbeat/notification response from a client device running a presence application.

Moving to decision operation 415, a determination is made as to whether a notification is ready to be sent to the client. For example, a status change of a user and/or an IM(s) may be ready to be sent to the client.

When a notification is ready to send, the process moves to operation 420, where the notification is immediately sent to the client device. When a notification is not ready to be sent, the process moves to operation 430.

At operation 430, the heartbeat response is sent to the client after waiting a predetermined period of time. Delaying sending the heartbeat response helps to save in the use of bandwidth. As discussed above, this delay period may change based on the connection. The delay period may also be configured to remain a constant delay time period.

Transitioning to decision operation 435, a determination is made as to whether the response was delivered. When the response is delivered, the process returns to operation 410. When the response is not delivered, the process moves to operation 440.

At operation 440, the server attempts to automatically reconnect with the client periodically.

Transitioning to decision operation 445, a determination is made as to whether a communication channel is open between the client and the server. When the devices are connected through the established communication channel, the process moves to operation 450 where any cached notifications including updated status information is sent to the client. According to one embodiment, this information may also include all or some of status updates and IM messages that were cached.

When the devices are not connected, the process moves to operation 460, where the server caches any notifications that are ready to be sent to the client. The notifications are cached as long as the disconnection is considered to be temporary.

Transitioning to decision operation 465, a determination is made as to whether the disconnection is longer then temporary. When the disconnection is not longer then temporary, the process returns to operation 440. When the disconnection is longer then temporary, the process moves to operation 470, where the status is set to offline and the server logs the client off of the communication server.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for operating during temporary disruptions of network connectivity between a client device running a presence application comprising Instant Messaging (IM) capability and a communications server that processes IM notifications, the method executing on a processor of the communications server, the method comprising:
    (a) establishing a communications channel between the client device and the communications server;
    (b) accepting login information from a user of the client device and changing the status of the client device from logged out to logged in;
    (c) receiving a heartbeat request from the logged in client device;
    (d) in response to receiving the heartbeat request, waiting a period of time to send a heartbeat response to the logged in client device, wherein a length of the period of time is configured by the communications server based on the network connectivity between the logged in client device and the communications server;
    (e) automatically identifying a data disconnection with the logged in client device when the communications server is not able to send a message over the communications channel;
    (f) determining whether the data disconnection is a temporary disconnection or a longer-lasting disconnection; and
        (1) when it is determined that the data disconnection is the temporary disconnection then, during a period of temporary disconnection:
            maintaining the client device as logged in even though there is a data disconnection;
            caching one or more incoming presence status updates for each of one or more contacts of the user of the client device;
            setting an away status for the user during the period of the temporary disconnection; and
            automatically attempting to re-establish a data connection with the client device; and
        (2) when it is determined that the data disconnection is the longer-lasting disconnection, changing the status of the client device to logged out and changing the status of the user to offline.

2. The method of claim 1, further comprising:
    (g) sending the one or more incoming presence status updates for each of the one or more contacts of the user to the client device when the data connection is re-established.

3. The method of claim 1, further comprising:
    (d) immediately sending a notification to the client device in response to receiving the heartbeat request instead of waiting the predetermined period of time to send the heartbeat response to the logged in client in response to receiving the heartbeat request.

4. The method of claim 3, wherein the notification is an IM.

5. The method of claim 1, wherein the communication channel uses an HTTP communication connection.

6. The method of claim 1, wherein the heartbeat response is empty.

7. The method of claim 1, wherein step (f) determining whether the data disconnection is a temporary disconnection or a longer-lasting disconnection further comprises:
    determining the data disconnection is a longer-lasting disconnection when the data disconnection has continued for a predetermined period of time, wherein a length of the predetermined period of time is configured by the communications server based on the network connectivity between the client device and the communications server.

8. A server computer that processes IM messages, the server computer comprising:
    a processor; and
    memory communicatively coupled to the processor, the memory storing computer-readable instructions that when executed by the processor cause the server computer to
        establish a communications channel between a client device and the server computer;
        accept log in information from the client device and change a status of the client device from logged out to logged in;
        receive a heartbeat request from the logged in client device;
        in response to receiving the heartbeat request, waiting a period of time to send a heartbeat response to the logged in client device, wherein a length of the period of time is configured by the server based on the network connectivity between the logged in client device and the server;

automatically identify a data disconnection with the client device running a presence application comprising Instant Messaging (IM) capability when the server is not able to send a message to the logged in client device over the communications channel;

determine whether the data disconnection is a temporary disconnection or a longer-lasting disconnection;

when it is determined that the data disconnection is the temporary disconnection then, during a period of temporary disconnection:
  maintain the status of the client device as logged in even though the data connection is disconnected;
  cache one or more incoming presence status updates for one or more contacts of the user of the client device;
  set user status for a user of the client device to away during the period of temporary disconnection; and
  automatically attempt to re-establish the data connection with the client device; and when it is determined that the disconnection is the longer-lasting disconnection, change the status of the client device-to logged out and change the status of the user to offline.

9. The server computer of claim 8, further comprising computer-readable instructions that cause the server computer to:
immediately send a notification to the client device in response to receiving the heartbeat request instead of waiting the period of time to send the heartbeat response to the logged in client in response to receiving the heartbeat request.

10. The server computer of claim 8, further comprising computer-readable instructions that cause the server computer to: provide at least some of the one or more cached incoming presence status updates to the client device after a connection is re-established.

11. A system for operating during temporary disruptions of network connectivity, comprising:

a processor and a computer-readable medium;
an operating environment stored on the computer-readable medium and executing on the processor;
a network interface unit configured to connect with a server;
a connection manager operating on the processor; and configured to perform tasks, comprising:
  establishing a data connection with the server;
  signing into the server with a login;
  sending a heartbeat request to the server;
  automatically identifying a data disconnection when a response to the heartbeat request is not received from the server within a time period, wherein the response from the server is one of an empty heartbeat response and a notification response and a length of the time period is based on the network connectivity;
  determining whether the data disconnection is a temporary disconnection or a longer-lasting disconnection; and
  during a period of temporary disconnection:
    maintaining the login with the server even though the data connection is disconnected;
    performing IM operations during the temporary disconnection;
    automatically attempting to re-establish a data connection; and
    converting an IM to a Short Message Service (SMS) message and delivering the SMS message instead of the IM message during the temporary disconnection; and
  during a period of the longer-lasting disconnection, signing out the user from the server and setting the presence status of the user to offline.

12. The system of claim 11, further comprising determining the data disconnection is a longer-lasting disconnection when the data disconnection has continued for a predetermined period of time, wherein a length of the predetermined period of time is based on the network connectivity between the client device and the communications server.

* * * * *